Nov. 30, 1965            C. C. MOSS            3,220,072
CLAMP STRUCTURE AND ASSEMBLY TOOL THEREFOR
Filed April 13, 1962
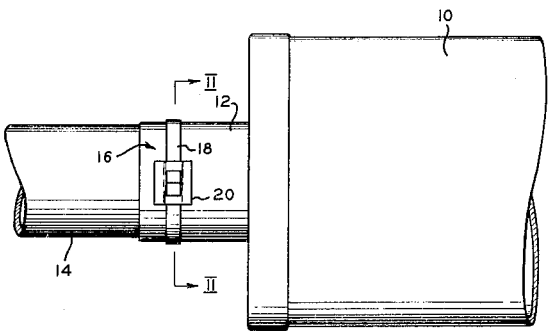
FIG. 1
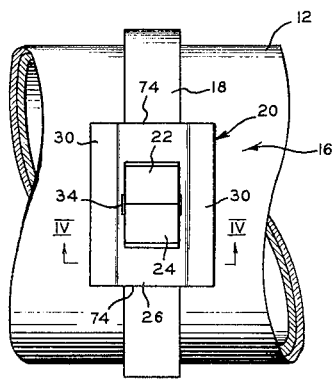
FIG. 3
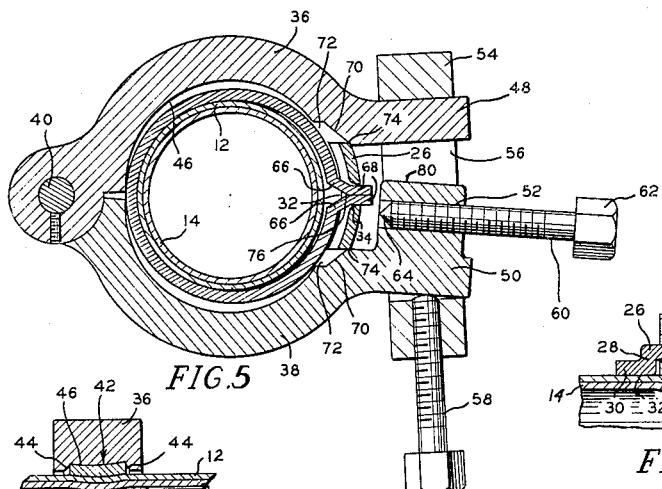
FIG. 5
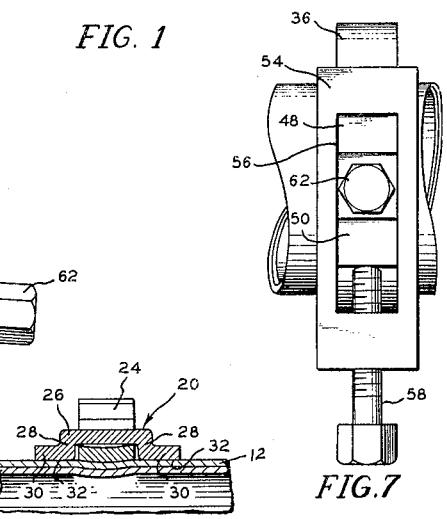
FIG. 4
FIG. 7
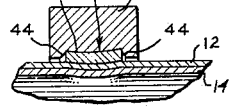
FIG. 8
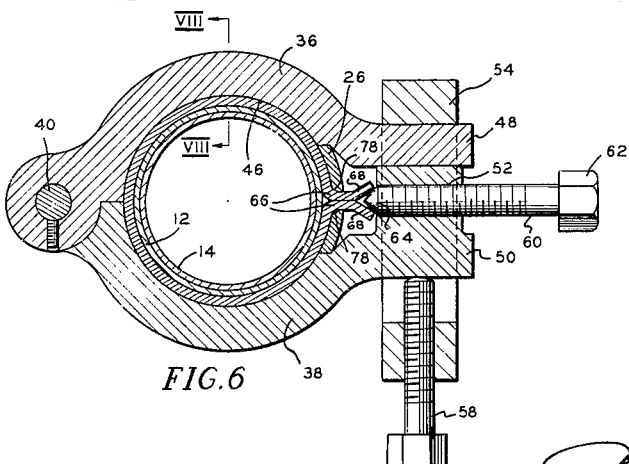
FIG. 6
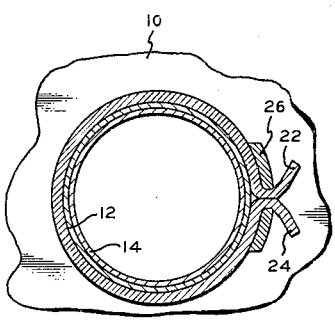
FIG. 2
INVENTOR
CHESTER C. MOSS
BY *Beaman & Beaman*
ATTORNEY United States Patent Office 3,220,072
Patented Nov. 30, 1965

3,220,072
CLAMP STRUCTURE AND ASSEMBLY TOOL THEREFOR
Chester C. Moss, East Lansing, Mich., assignor, by mesne assignments, to Doris Moss Oldacre, Jackson, Mich.
Filed Apr. 13, 1962, Ser. No. 187,355
5 Claims. (Cl. 24—20)

The invention pertains to a clamp and particularly relates to an annular, circumferential-type clamp for circumscribing cylindrical members and the like.

A basic object of the invention is to provide a circumferential clamp, such as the type which may be employed with automotive exhaust systems, which provides a full 360° compression and is of a trouble-free and low-cost construction.

Another object of the invention is to provide a circumferential clamp which may be firmly compressed upon the member circumscribed, and may be readily fastened to maintain the compressed configuration.

A further object of the invention is to provide a circumferential clamp which closely conforms to the configuration of the member being clamped and is relatively concise in configuration.

Yet another object of the invention is to provide a tool for compressing a clamp having the above objects wherein the tool is easy to operate, provides a uniform clamping action and superior sealing and deformation characteristics, and may be employed in limited working areas.

These and other objects of the invention arising from the details and relationships of the components of an embodiment thereof will be apparent from the following description and accompanying drawings wherein:

FIG. 1 is an elevational view of a muffler and exhaust pipe assembly employing a clamp in accord with the invention, FIG. 2 is an elevational, sectional, view take along section II—II of FIGS 1, FIG. 3 is an enlarged, detail view of a clamp and pipe assembly, as shown in FIG. 1, FIG. 4 is an elevational, detail, sectional view taken along section IV—IV of FIG. 3, FIG. 5 is an elevational, sectional view, taken through the assembly tool and clamp during an initial state of assembly, FIG. 6 is a elevational, sectional view, taken through the tool and clamp upon complete compression of the clamp and prior to the forming of the clamp ends, FIG. 7 is an end view of the assembly tool as taken from the right of FIG. 6, and FIG. 8 is an elevational, detail, sectional view of the tool, band, neck, and pipe taken along section VIII—VIII of FIG. 6.

While the clamp structure in accord with the invention may be used with many applications wherein a cylindrical member is to be circumferentially compressed, the clamp is particularly suitable for use with internal combustion engine muffler applications, and for purposes of illustrtation will be described as employed in such application.

Referring to FIG. 1, a typical use of the clamp will be appreciated. A muffler 10 for an internal combustion engine is provided with a cylindrical connection neck 12. An exhaust pipe 14 of a tubular configuration, having an O.D. substantially equal to the I.D. of the muffler neck is telescopically received within the neck. The clamp 16 consisting of an annular band 18 and a retainer member 20 is mounted upon the neck for clamping the neck upon the exhaust pipe in intimate connection therewith for producing a seal.

Referring to FIGS. 2 through 4, the configuration and details of the clamp will be appreciated. The band 18 is of an annular form constructed of a relatively heavy metal, such as 11 gauge steel strip. The band material should be tough and relatively flexible but be of sufficient hardness to maintain the ends in the deformed position, as shown in FIG. 2. The band is of a normal rectangular cross section and will be preformed to an annular configuration wherein the band ends nearly engage. The band is provided with end portions 22 and 24, which are generally radially disposed with respect to the remainder of the band configuration prior to deformation.

The band retainer 20 is of a substantially U-transverse configuration, as will be appreciated from FIG. 4. The retainer includes a base portion 26 having leg portions 28 depending therefrom. Flanges 30 extend from the leg members extending away from each other and are provided with concave cylindrical surfaces 32 for engaging the muffler neck 12. The retainer is of a longitudinal arcuate configuration, FIG. 2, whereby the base portion 26 closely conforms to the configuration of the clamp, and the surfaces 32 are of a radius substantialy equal to the radius of the outer surface of the neck 12. Thus, it will be appreciated that as the surfaces 32 engage the neck on either side of the band adjacent the end portions 22 and 24, the band and retainer together will provide complete 360° engagement with the neck, thus providing a complete and uniform compression of the neck upon the exhaust pipe 14.

The base portion 26 of the retainer is provided with a substantially rectangular opening 34 through which the band ends 22 and 24 pass, and upon the band ends being deformed away from each other, as shown in FIG. 2, the deformation of the band ends into engagement with opposite sides of the opening will prevent radial expansion of the band and, also, prevent removal of the retainer from the band or withdrawing of the band ends through the retainer opening. The distance between the opposed sides of the retainer opening engaged by the band ends, is slightly greater than the combined thickness of the band ends. The inner surface of the retainer base portion 26 is of a diameter substantially equal to the outer diameter of the band when compressed whereby these surfaces will engage intimately during assembly, as illustrated. Also, the distance between legs 28 is slightly greater than the band width.

The tool for assembling the clamp, in accord with the invention, is shown in FIGS. 5 through 8. The tool includes a pair of band-engaging members 36 and 38 pivotally interconnected by a pivot pin 40. The members 36 and 38 are substantially semicylindrical in configuration and are provided with an internal groove 42, FIG. 8, for receiving the band 18. It will be noted that the groove 42 is defined by tapered lateral sides 44 and an arcuate convex surface 46. The tapered sides 44 assure the band being centered within the groove and the convex surface 46 will tend to bow the clamping band during compression, as shown in FIG. 8. The advantage of bowing the clamping band during compression lies in the improved indentation and deformation characteristics achieved in the muffler neck, which in turn provide an improved sealing connection with the exhaust pipe. Also, the bowing of the band tends to minimize the chipping and breaking of ceramic or other antirust surfaces employed with modern mufflers, and reduces the force necessary to produce the radial contraction of the band.

The clamping members 36 and 38 are provided with radial ears 48 and 50, respectively, in substantially opposed relation to the pivot pin. The ear 48 is of a rectangular configuration, FIG. 7, and the ear 50 includes an enlarged portion having a threaded bore 52 defined therein which is radially related to the band groove 42 of member 38. A rectangular collar 54 having an internal rectangular opening 56 defined therein is adapted to be placed over the ears 48 and 50, and a threaded bore is provided in the collar for receiving the threaded screw 58. Tightening of the screw 58 will draw the ears of the clamping members toward each other to close the tool upon the collar being placed over the ears.

The band end-deforming tool 60 includes a threaded shank received within the bore 52 having a head 62 defined thereon for cooperation with a wrench or other turning means. The other end of the tool 60 is formed with a conical surface 64 substantially defining an included angle of 90°.

Assembly of the clamp is as follows:

A band 18 is usually initially placed upon the neck 12 and the exhaust pipe 14 will be thereupon inserted into the neck. If the neck and exhaust pipe have been previously assembled, the band may be opened and placed over the neck. The band, in its initial form, is provided with end portions 22 and 24 shaped as shown in FIG. 5. Thus, each end portion includes a first portion 66 which is angularly related to the adjacent band portion, and a second portion 68 which is substantially radially disposed to the band configuration. Upon bringing of the portions 68 together, as shown in FIG. 5, the retainer may be placed upon the band as the portions 68 will easily extend through the opening 34. The retainer 20 may be placed upon the clamp end portions, to the extent shown in FIG. 5, by manually contracting the band until portions 68 engage. In circumscribing a 2" neck, the internal diameter of the band configuration of FIG. 5 will be, preferably, about 1/32" greater than the O.D. of the neck. Upon fully compressing the band, the band I.D. will, preferably, be about 1/32" less than the normal O.D. of the neck.

After the retainer is placed upon the clamp band end portions 68, the assembly tool is thereupon opened and the clamping members 36 and 38 are placed about the band whereby the band will be received within the grooves 42 of the members. Each of the clamping members is provided with a cam surface 70 defined in a recess 72 in the ears of the clamping members. Upon placing the assembly tool upon the clamp band, the tool or band is oriented so that the retainer base edges 74 will engage the cam surfaces 70, as shown in FIG. 5. Thereupon, the collar screw 58 will be backed off to withdraw the screw from opening 56 and the collar is placed upon the ears, as shown in FIG. 5.

Tightening of the screw 58 will draw the ears 48 and 50 toward toward each other and close the clamping members. This closing of the clamping members 36 and 38 will radially compress the band upon the neck 12 and simultaneously the cam surfaces 70 will move the retainer toward the band end portions 66. As the radial compression of the band takes place, the distance between the opposed surfaces of the end portions 66 decreases, and a pivoting between the clamp end portions occurs at point 76, due to the difference in the angular relationship of end portions 66 and 68. Thus, the cam surfaces 70 should be of such an angle as to permit the retainer to move radially inward at substantially the rate permitted by the radial contraction of the band, and the retainer opening surfaces are radiused to prevent gouging and enable the retainer to aid in the compression. Upon the ear portion surface 80 abutting the ear 48, as shown in FIG. 6, the clamps will be completely closed and the retainer will be at its most inward position, as illustrated. In this position the retainer surfaces 32 will be tightly engaging the neck adjacent the band end portions and a full 360° compression of the neck will be accomplished. Due to the pivoting of the end portions 66 and 68 about the point 76, the portions 68 will have "opened," as illustrated, for facilitating entry of the deforming point surface 64 of the tool 60. The operator now rotates the deforming tool 60 to force the point thereof between the portion 68 of the clamp ends, forcing the end portions apart and into intimate engagement with the sides of opening 56. The deforming tool will be tightened as far as possible with conventional wrenches. After complete tightening of the deforming tool 60, the band end portions will be deformed as shown in FIG. 2, locking the assembly of the clamp and maintaining the compression produced during closing of the assembly tool. The operator then backs off the deforming tool 60 and unthreads screw 58 sufficiently to permit removal of the collar from the ears. The assembly tool may then be completely opened and removed from the clamp.

It will be appreciated from FIG. 2 that the assembled clamp closely conforms to the configuration of the neck and that a complete circumferential engagement with the neck is produced. As no machined parts are necessary in the clamp, the cost may be maintained at a minimum, and it will be understood that the material requirements for the clamp are small with respect to conventional clamps of the same size. The relatively heavy material of the band will prevent the clamp from loosening during use due to vibration or other causes. However, by employing a pair of pliers, the band ends may be pinched together and the retainer may be easily removed from the band to permit easy removal of the clamp for muffler maintenance or replacement purposes. The assembly tool will "round up" the muffler neck during compression and the band will retain a "bowed" transverse cross section after removal of the assembly tool. These features provide improved sealing characteristics.

It is understood that various modifications to the invention may be apparent to those skilled in the art without departing from the spirit and scope thereof. For instance, the inventive concept could be used with clamps employing a plurality of band elements and retainers, and it is intended that the invention be defined only by the following claims.

What is claimed is:

1. A circumferential clamp comprising, in combination, an annular band formed of a relatively heavy deformable material having an inner surface defining an inner diameter, ends defined on said band substantially radially outwardly disposed with respect to the band configuration, a retainer of an arcuate configuration having a U-shaped transverse cross section, said retainer cross section including leg portions interconnected by a base portion, an opening defined in said base portion, and portions of said band ends extending through said opening and being deflected away from each other and back toward the associated band end into engagement with said retainer affixing said retainer upon said band and maintaining said band in a radially contracted condition, each of said leg portions having an arcuate concave surface defined thereon corresponding to and concentric with said band inner surface upon affixing said retainer upon said band end portions.

2. As an article of manufacture, a clamping element comprising an annular circular band having ends, said band having a preliminary closed position and a fully closed position, each of said ends including first and second portions, said first band end portions being angularly deflected outwardly with respect to the band configuration whereby said first end portions together form a V converging outwardly upon positioning said band ends adjacent each other, and each second band end portion depends from its respective first portion in a direction extending radially with respect to the band preliminary closed position whereby said second end portion of each band end may engage in parallel relation upon preliminary closing of said band.

3. A circumferential clamp comprising, in combination, an arcuate band having ends, said band having an inner surface defining a cylindrical surface upon radial contraction of the band, a band retainer operatively associated with said band ends, said retainer being of arcuate configuration having a U-transverse cross section defining leg portions interconnected by a base portion, the distance separating the leg portions of said retainer being greater than the axial width of said band, an opening defined in said retainer base portion adapted to receive the ends of said band, a concave arcuate surface defined on each of said leg portions of a configuration similar to and concentric with said band inner surface upon assembly and contraction of said clamp, said band ends being deformed into engagement with said retainer upon insertion through said opening maintaining said band in radially contracted condition.

4. In a circumferential clamp as in claim 3, wherein said band ends include first and second portions, said first portion being angularly related to the associated band and extending outwardly from the configuration thereof at an angle substantially less than 90° with respect to the band portion immediately adjacent said first band portion, said second band portion depending from said first portion and substantially radially disposed with respect to the band configuration before contraction, the second portions of adjacent ends of said band engaging in substantially parallel relation for insertion through said retainer opening and said first portions defining a V converging toward said first portions, said opening having edges engaging said first portions whereby, upon radially displacing said retainer toward said first portions, said first portions aid in radially contracting said band and said second portions separate.

5. In a circumferential clamp as in claim 3, wherein said retainer leg portions include flange portions, said flange portions extending substantially parallel to said base portion and outwardly with respect to the recess defined by said leg and base portions, said concave arcuate surface being defined on the surface of said flange radially furtherest removed from said base portion.

References Cited by the Examiner

UNITED STATES PATENTS

| 23,092 | 3/1859 | Knowles | 24—23 |
|---|---|---|---|
| 442,934 | 12/1890 | Ackerman | 81—9.3 X |
| 523,729 | 7/1894 | Pfleghar | 81—9.3 X |
| 633,790 | 9/1899 | Burgher | 81—9.3 |
| 876,702 | 1/1908 | Driscoll | 81—9.3 |
| 989,855 | 4/1911 | Lewis | 81—9.3 |
| 1,034,100 | 7/1912 | Gibbs | 81—9.3 |
| 1,119,437 | 12/1914 | Lautz et al. | 81—9.3 |
| 1,547,208 | 7/1925 | Farmer | 24—23 |
| 1,696,194 | 12/1928 | Foreman | 81—9.3 |
| 1,776,783 | 9/1930 | Cornell | 24—23 |
| 1,824,083 | 9/1931 | Hoff. | |
| 1,987,127 | 1/1935 | Rice | 24—22 |
| 2,285,850 | 6/1942 | Weeks | 24—20 |
| 2,653,787 | 9/1953 | Myrick | 24—257 |

FOREIGN PATENTS

| 497,110 | 10/1953 | Canada. |
|---|---|---|
| 570,492 | 7/1945 | Great Britain. |

WILLIAM FELDMAN, *Primary Examiner.*

WALTER A. SCHEEL, DONLEY J. STOCKING,
*Examiners.*